(12) United States Patent
Guerra Delgado et al.

(10) Patent No.: US 11,403,260 B2
(45) Date of Patent: Aug. 2, 2022

(54) HASH-BASED DATA TRANSFER IN DISTRIBUTED DEDUPLICATION STORAGE SYSTEMS

(71) Applicant: VMware, Inc., Palo Alto, CA (US)

(72) Inventors: Jorge Guerra Delgado, Fremont, CA (US); Eric Knauft, San Francisco, CA (US); Gopala Suryanarayana, Fremont, CA (US); Sandeep Rangaswamy, Mountain View, CA (US); Srinath Premachandran, Fremont, CA (US)

(73) Assignee: VMware, Inc., Palo Alto, CA (US)

( * ) Notice: Subject to any disclaimer, the term of this patent is extended or adjusted under 35 U.S.C. 154(b) by 468 days.

(21) Appl. No.: 15/652,572

(22) Filed: Jul. 18, 2017

(65) Prior Publication Data

US 2019/0026303 A1   Jan. 24, 2019

(51) Int. Cl.
*G06F 16/174* (2019.01)
*H04L 67/10* (2022.01)
*G06F 16/22* (2019.01)
*H04L 67/1097* (2022.01)

(52) U.S. Cl.
CPC ...... *G06F 16/1748* (2019.01); *G06F 16/2237* (2019.01); *G06F 16/2255* (2019.01); *H04L 67/10* (2013.01); *H04L 67/1097* (2013.01)

(58) Field of Classification Search
None
See application file for complete search history.

(56) References Cited

U.S. PATENT DOCUMENTS

| 8,453,257 | B2  |   | 5/2013  | Anglin et al. |
|-----------|-----|---|---------|---------------|
| 9,106,592 | B1  | * | 8/2015  | Arimura ............... G06F 5/065 |
| 9,215,205 | B1  | * | 12/2015 | Smith ............... H04L 61/1511 |
| 2008/0077630 | A1 | * | 3/2008 | Keith ............... G06F 11/1451 |
| 2011/0066601 | A1 | * | 3/2011 | Rieger ............... G06F 16/2365 |
| | | | | 707/690 |
| 2012/0317353 | A1 | * | 12/2012 | Web ............... G06F 3/065 |
| | | | | 711/108 |
| 2013/0054524 | A1 | * | 2/2013 | Anglin ............... G06F 16/27 |
| | | | | 707/624 |
| 2014/0222770 | A1 | * | 8/2014 | Lad ............... E21D 21/008 |
| | | | | 707/692 |

(Continued)

OTHER PUBLICATIONS

Laoutaris N., et al., "Inter-Datacenter Bulk Transfers with NetStitcher," SIGCOMM'11, Aug. 15-19, 2011, pp. 74-85.

(Continued)

*Primary Examiner* — Thu N Nguyen
(74) *Attorney, Agent, or Firm* — Fish & Richardson P.C.

(57) ABSTRACT

Exemplary methods, apparatuses, and systems include a destination node receiving, from a source node, a hash of data stored by the source node and designated for transfer from the source node to the destination node. In response to determining the hash received from the source node maps to data stored by the destination node, the destination node reads the data into a write buffer and transmits an indication to the source node that the data is present at the source node. The destination node reads the data from write buffer and, in response to determining the data read from the write buffer remains unchanged as stored by the destination node, increases a reference count for the data as stored by the destination node.

20 Claims, 4 Drawing Sheets

(56) References Cited

U.S. PATENT DOCUMENTS

| | | | | |
|---|---|---|---|---|
| 2014/0379853 | A1* | 12/2014 | Shelton | G06F 9/4868 |
| | | | | 709/217 |
| 2015/0169613 | A1* | 6/2015 | Bshara | G06F 16/9014 |
| | | | | 707/692 |
| 2015/0277924 | A1* | 10/2015 | Zappulla | G06F 9/3851 |
| | | | | 712/215 |
| 2015/0289013 | A1* | 10/2015 | Nelson | H04N 21/25883 |
| | | | | 725/19 |
| 2016/0080386 | A1* | 3/2016 | Noronha | H04L 63/101 |
| | | | | 713/162 |

OTHER PUBLICATIONS

Pucha H., et al., "Exploiting Similarity for Multi-Source Downloads Using File Handprints," In Proceedings of the 4th Symposium on Networked Systems Design and Implementation (NSDI '07), Apr. 2007, 15 pages.

* cited by examiner

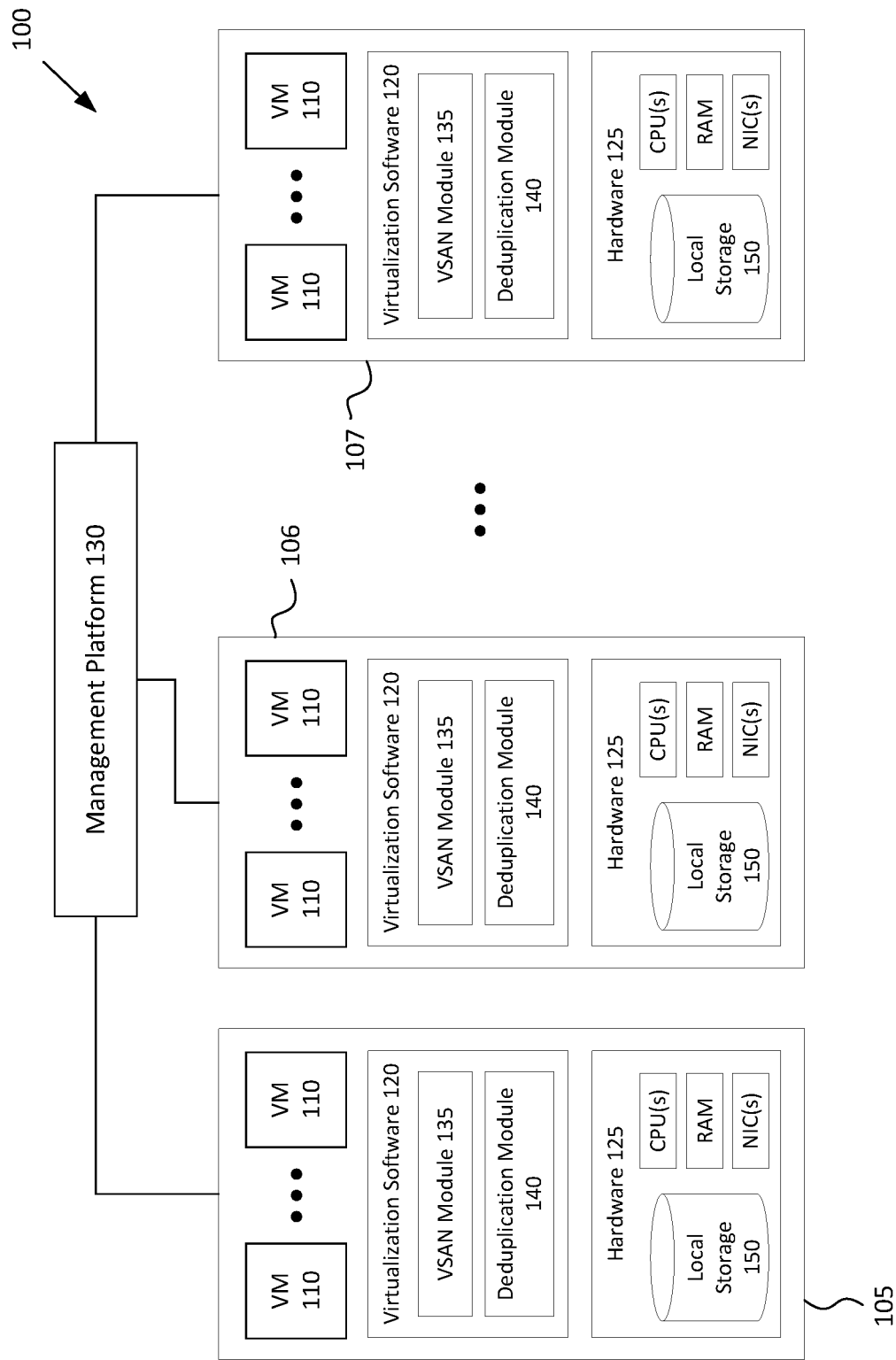

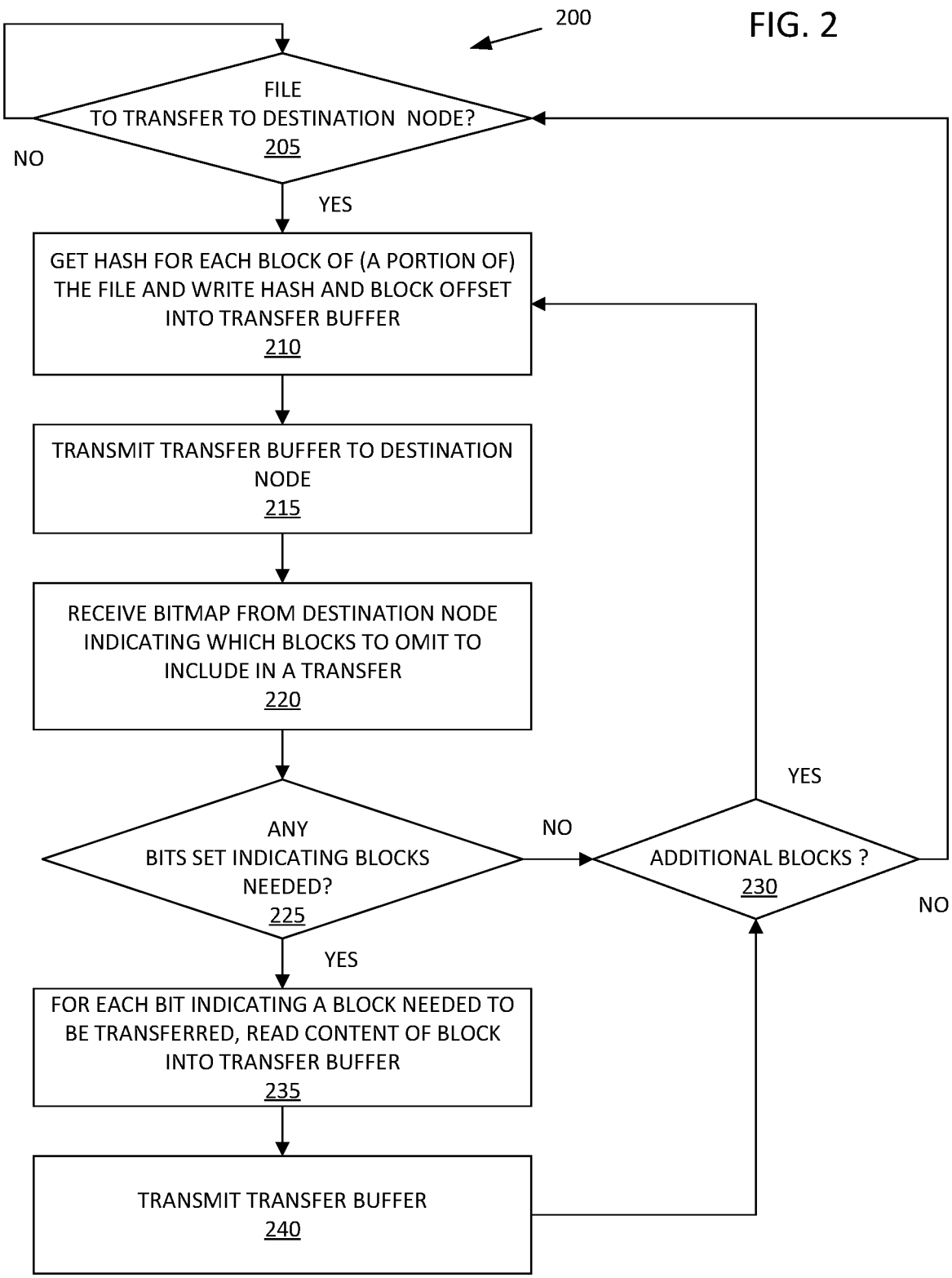

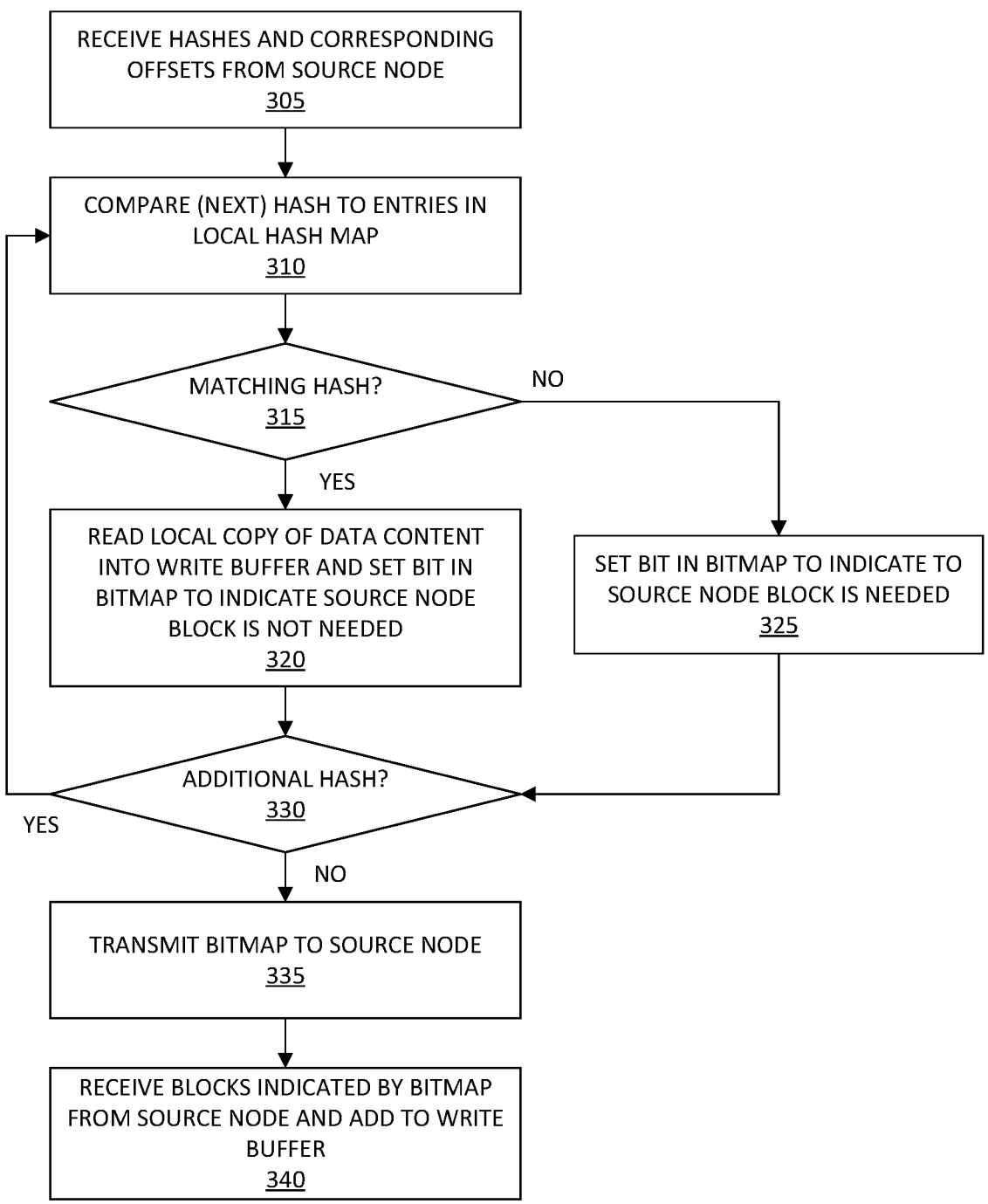

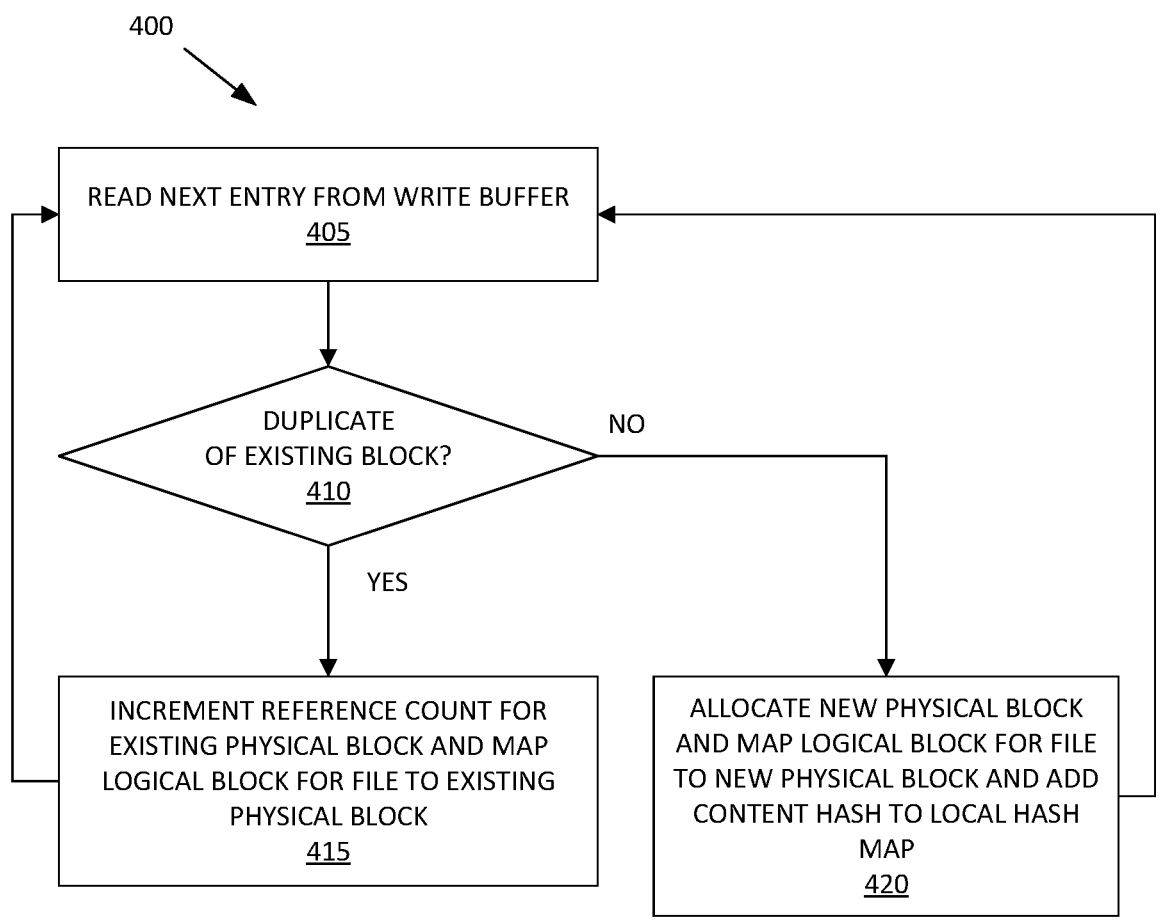

HASH-BASED DATA TRANSFER IN DISTRIBUTED DEDUPLICATION STORAGE SYSTEMS

FIELD OF THE INVENTION

The various embodiments described in this document relate to transferring data between nodes within a distributed deduplication storage system. In particular, embodiments relate to using hashes of data content to determine if the data needs to be transferred and avoiding data corruption when the data content does not need to be transferred.

BACKGROUND OF THE INVENTION

In distributed storage systems, various high-level objectives such as decommissioning of a host or disk, capacity-based load balancing, etc. require moving data from one node to another node. Such data movement tasks typically involve reading data from a source storage device and transmitting and writing the data to a destination storage device. If the distributed storage system supports content-based data deduplication, however, naively transferring data may result in transferring duplicate data existing at both the source and destination. The system will end up doing significantly more work than required. For example, a transfer may include a file at the source containing ten copies of the same data block, with the same block already being present at the destination. Using the naive approach, the system will read, transfer, and write all ten copies. In systems without deduplication, this is not a significant issue because there is usually a one-to-one mapping of file system/logical blocks to physical disk blocks. With support for data deduplication, however, a many-to-one mapping may be used instead of storing multiple copies of the physical block. Naively transferring data in a deduplicated system is very inefficient in multiple aspects. From a networking perspective, the system transfers significantly more data than required. From a processing and storage perspective, the system reads and writes more data than what will be physically present at the destination.

BRIEF DESCRIPTION OF THE DRAWINGS

The present invention is illustrated by way of example and not limitation in the figures of the accompanying drawings, in which like references indicate similar elements, and in which:

FIG. 1 illustrates, in block diagram form, an exemplary virtual data center environment including one or more networked processing devices implementing hash-based data transfers in distributed deduplication storage system;

FIG. 2 is a flow chart illustrating an exemplary method of a source node transferring a file within a distributed deduplication storage system;

FIG. 3 is a flow chart illustrating an exemplary method of a destination node receiving a transfer of a file within a distributed deduplication storage system; and FIG. 4 is a flow chart illustrating an exemplary method of the destination node processing a transfer of the file using a write buffer to prevent data corruption.

DETAILED DESCRIPTION

This document describes embodiments that implement hash-based data transfers in distributed deduplication storage system. In particular, embodiments are directed to a source node transmitting content-based hashes of blocks of data designated for transfer to a destination node. The destination node responds with a bitmap indicating, based upon matching hashes, blocks of data for which the destination node already has a copy. The source node only transmits the blocks for data not already stored by the destination node. As a result, the system utilizes less processing and network resources by omitting duplicate data from the transfer. Additionally, embodiments are directed to the destination node reading the data content for matching hashes into a write buffer. When each write buffer entry for matching hashes is processed, the destination node increments the reference count for the physical blocks that continue to have matching data stored by the destination node. If any data changed subsequent to detecting a matching hash, the processing of the write buffer entry results in writing the data as a new physical block. As a result, intervening changes to the underlying data that triggered the hash match do not result in corrupt data entries.

FIG. 1 illustrates, in block diagram form, exemplary computing environment 100, including one or more networked nodes 105-107 to implement hash-based data transfers in distributed deduplication storage system. Nodes 105-107 may also be referred to within this document as physical computers, hosts, and/or servers. In one embodiment, one or more virtual machines (VMs) 110 implement a virtualized computer, that can provide computing services such as a network server, remote productivity desktop or a networking, storage, or security service (e.g., a firewall, webserver, database server, etc.). Although not shown, one or more of VMs 110 may include containerized applications, or be generally referred to as data compute nodes (DCNs), which could include application containers as further described below.

Hardware 125 includes one or more processors ("CPU(s)"), data storage and memory (e.g., "RAM"), and network interface controllers ("NIC(s)"). The data storage and memory may be used for storing data, metadata, and programs for execution by the processor(s). The data storage and memory may include one or more of volatile and non-volatile memories, such as Random Access Memory ("RAM"), Read Only Memory ("ROM"), a solid-state drive ("SSD"), Flash, Phase Change Memory ("PCM"), or other types of data storage, such as magnetic disk drives, optical disk drives, etc. The memory may be internal or distributed memory.

One or more buses may be used to interconnect the various components of hardware 125. Additionally, the network interface controllers may be used to connect nodes 105-107, via a wired or wireless network, with one another.

Virtualization software layer 120 runs on hardware 125 of nodes 105-107. Virtualization software layer 120 manages VMs 110 and physical resources, such as hardware 125. Additionally, virtualization software layer 120 maintains virtual-to-physical hardware mappings. For example, virtualization software 120 may manage VM access to a processor, memory, or a network interface within hardware 125. Additionally, virtualization software 120 may manage access to virtual disks (or portions thereof) and other related files within local storage 150 that may be accessed by VMs 110 residing in one or more nodes 105-107.

Management platform 130 is associated with nodes 105-107. Management platform 130 enables an administrator to manage the configuration of computing environment 100. In one embodiment, management platform 130 provides a management console for manual and automated control of nodes 105-107, VMs 110, and hardware 125. For example, management platform 130 may provision, configure, and maintain VMs 110 as virtual desktops or network services, manage pools of computer resources to run VMs 110, etc. In one embodiment, an administrator sets and/or defines storage policies using management platform 130. Such storage policies may result in the transfer of files or other portions of data between nodes 105-107 as described within this document.

Local storage 150 housed in or otherwise directly attached to nodes 105-107 may include combinations of solid-state drives (SSDs) and/or magnetic or spinning disks (MDs). As used in this document, the term "housed" or "housed in" may be used to encompass both housed in or otherwise directly attached storage. In certain embodiments, SSDs serve as a read cache and/or write buffer in front of magnetic disks to increase I/O performance.

Each of nodes 105-107 includes storage management or virtual storage-area network (VSAN) module 135 to automate storage management workflows and provide access to objects within the distributed deduplication storage system. Each VSAN module 135 (e.g., through an object management layer or submodule) communicates with other VSAN modules 135 of other nodes 105-107 to create and maintain a directory service or an in-memory metadata database (e.g., maintained separately but in synchronized fashion in the memory of each of nodes 105-107) that contains metadata describing the locations, configurations, policies, and relationships among the various objects stored in an object store. VSAN module 135 traverses a hierarchy of objects using the metadata in the in-memory database in order to properly route an I/O operation request to the node (or nodes) that houses (house) the actual physical local storage that backs the portion of the virtual disk that is subject to the I/O operation. As a result, each of nodes 105-107 provides a separate storage domain while VSAN modules 135 present the collective storage 150 as a single distributed storage system.

Nodes 105-107 also include deduplication module 140. For example, deduplication modules 140 may be a part of virtualization software 120 and work in cooperation with VSAN modules 135 to identify, read, and write data as a part of a transfer from a source node to a destination node. In particular, deduplication modules 140 implement hash-based data transfers as described with reference to FIGS. 2-4. While described with reference to computing environment 100, deduplication module 140 may also be implemented in other computing environments. For example, deduplication module 140 may implement the hash-based data transfers described within this document in a server, computer, or other computing environment that does not include virtual machines.

FIG. 2 is a flow chart illustrating exemplary method 200 of source node 105 transferring a file within a distributed deduplication storage system. At block 205, source node 105 determines if there is a file to transfer to destination node 106. For example, a storage policy, decommissioning of a node, or another trigger may cause VSAN module 135 and deduplication module 140 to transfer one or more files from the source node to the destination node.

If there is no data to transfer, method 200 continues to return to/wait at block 205 until there is data to transfer. If there is a file to transfer, at block 210, source node 105 reads a hash and offset value for each data block of a current portion of the file and writes the hash and offset value into a transfer buffer. For example, deduplication module 140 maintains an index or other data structure (hash map) that maps each data content hash to a physical data block and a reference count for the physical data block. When the source node writes a new physical block of data to storage 150, deduplication module 140 creates a hash of the data content and stores the hash in the hash map along with the physical data block number and a reference count.

In one embodiment, source node 105 transfers the file in batches of blocks. For example, each batch of blocks transmitted via transfer buffer may amount to only a portion of the file. While embodiments described in this document reference blocks, different units of data may be used to create hashes and implement the data transfer. Additionally, embodiments are not limited to a particular block size. Embodiments are also not limited to the transfer of a file. For example, embodiments may transfer a set of data blocks that make up an abstraction of data other than a file.

In one embodiment, the distributed deduplication storage system supports data blocks that do not have a corresponding hash. In such an embodiment, source node 105 adds the data blocks to the transfer buffer along with the hashes. For example, deduplication module may write the data blocks, file name or indicator, offset value, and, optionally, an indication/flag that the entry is a data block rather than a hash.

At block 215, source node 105 transmits the contents of the transfer buffer to destination node 106. For example, the transfer buffer includes a file name or other indicator of the file, a plurality of hashes of content of data blocks that make up a portion of the file, and an offset value for each hash to indicate the location of the corresponding data block within the file.

At block 220, source node 105 receives a bitmap or similar data structure from destination node 106. The bitmap indicates which hashes transmitted by source node 105 matched hashes maintained by destination node 106 for data stored at destination node 106. The order of bits in the bitmap correspond to the order of hashes transmitted by source node 105. For example, a bit set to a first value in the bitmap may indicate that a corresponding hash transmitted by source node 105 matches a hash stored by destination node 106. A matching hash indicates that the data block stored by destination node 106 is duplicative of a data block designated for transfer. Thus, source node 105 does not need to transmit a copy of the duplicative data block. Bits set to a second value in the bitmap indicate hashes that did not find a match at destination node 106. Hashes without a match represent data blocks that need to be transferred from source node 105 to destination node 106.

At block 225, source node 105 determines if any bits set within the bitmap indicate data blocks that need to be transferred to destination node 106. For example, deduplication module 140 parses the bitmap to determine which hashes have matches at destination node 106. In one embodiment, deduplication module 140 compares the bitmap to the transfer buffer including the hashes and block offset values transmitted to destination node 106 (or a copy of the transfer buffer, a list of offset values that source node 105 sent via the transfer buffer, etc.) to determine which hashes/data blocks have matches at destination node 106.

If the bitmap has no bits set to a value indicating a need for data block transfer, at block 230, source node 105 determines if there are additional blocks for the file transfer. If a portion of the file has yet to be evaluated for transfer to destination node 106 (by transferring hashes), method 200 returns to block 210 to process the next portion of the file. If no additional data blocks of the file remain to be evaluated for transfer, method 200 returns to block 205 to process the next file, if any.

If the bitmap includes one or more bits set to a value indicating data blocks that need to be transferred to destination node 106, at block 235, source node 105 reads the data content for each needed data block into the transfer buffer. For example, deduplication module 140, via VSAN module 135, uses the file name and offset values to read the data content from the physical data blocks into the transfer buffer. In addition to the data content, deduplication module 140 writes to the transfer buffer the file name or other indicator of the file and an offset value for each data block to indicate the location of the corresponding data content within the file. In one embodiment, source node 105 reads the data content into a different buffer than the transfer buffer used to transmit the hashes.

At block 240, source node 105 transmits the data content in the transfer buffer to destination node 106. Because of the transmission of the hashes and parsing of the hash map received in response, source node 105 is likely to read and transmit fewer data blocks to transfer the file. For example, a data block may be 4 kilobytes in size while a corresponding hash entry may be approximately 20 bytes in size. Transmitting the hash entry and determining that the data block does not need to be transferred results in a significant storage processing and network resource savings per data block.

FIG. 3 is a flow chart illustrating exemplary method 300 of destination node 106 receiving the transfer of a file within a distributed deduplication storage system. Method 300 provides actions of destination node 106 that correspond to the actions of source node 105, e.g., in method 200.

At block 305, destination node 106 receives a batch of hashes and offset values from source node 105. For example, destination node 106 receives the contents of transfer buffer transmitted by source node 105 at block 215 of method 200.

At block 310, destination node 106 compares the first/next hash from the received batch to entries in a local hash map Like source node 105, deduplication module 140 of destination node 106 maintains hash map that maps each hash of local data content to a physical data block (e.g., disk location) and a reference count for the physical data block stored by destination node 106.

At block 315, determines if the current hash received from source node 105 matches a local hash. For example, deduplication module 140 uses a bloom filter or another probabilistic data structure to test whether the current received hash matches a local hash stored by destination node 106. Alternatively, deduplication module 140 performs a simple lookup or otherwise searches the local hash map for a match.

If deduplication module 140 detects a match between the current hash received from source node 105 and a local hash, at block 320, deduplication module 140 accesses the physical data block mapped to the matching local hash and reads the data content of the data block into a write buffer. For example, write buffer may be a first in, last out queue of write commands to add or update physical blocks stored by destination node 106. If the content of the physical data block remains unchanged by the time destination node 106 processes the write buffer entry, deduplication module 140 of destination node 106 increments a reference count for the physical data block. Destination node 106 processes the write buffer in parallel with method 300, e.g., as described with reference to FIG. 4. Given that destination node 106 has a copy of the data content corresponding to the matching hash, deduplication module 140 sets a bit in the bitmap to a value indicating that source node 105 does not need to transfer the data block. For example, entries in the bitmap are described with reference to blocks 220-225 of method 200.

If deduplication module 140 does not detect a match between the current hash received from source node 105 and a local hash, at block 325, deduplication module 140 sets the bit in the bitmap to a value indicating that source node 105 needs to transfer the data block as a part of the file transfer.

At block 330, deduplication module 140 of destination node 106 determines if any hashes in the received batch remain to be processed. If there is another hash, method 300 returns to block 310 to compare the next hash to the local hash map.

Once deduplication module 140 of destination node 106 has processed each hash received in the batch from source node 105, at block 335, destination node 106 transmits the bitmap to source node 105.

If the bitmap indicated that one or more data blocks needed to be transferred, at block 340, destination node receives the data blocks from source node 105 and adds them to the write buffer.

FIG. 4 is a flow chart illustrating exemplary method 400 of destination node 106 processing a transfer of the file using a write buffer to prevent data corruption. As described with reference to FIG. 3, the write buffer may be implemented as a first in, last out queue.

At block 405, destination node 106 processes the next write command in the write buffer. For example, the write buffer may contain one or more write commands added to the write buffer prior to deduplication module 140 reading local data content into the write buffer in response to a matching hash, as described with reference to block 320 of method 300. Destination node 106 may process these additional write commands, e.g., after deduplication module 140 reads the local data content into the write buffer in response to a matching hash.

At block 410, deduplication module 140 of destination node 106 determines if the write command is directed to writing a duplicate of an existing, local data block stored by destination node 106. For example, the local data content added to the write buffer in response to a matching hash will be a duplicate of the content of an existing physical data block if that data block remained unchanged from the time it was added to the write buffer until that entry of the write buffer was processed. If, however, the one or more additional write commands processed after deduplication module 140 reads the local data content into the write buffer delete or change the content of the physical data block, the local data content added to the write buffer in response to a matching hash will not be a duplicate of the content of an existing physical data block.

If the current entry in the write buffer is directed to writing a duplicate of an existing, local data block stored by destination node 106, at block 415, deduplication module 140 increments the reference count for the existing data block. For example, deduplication module 140 of destination node 106 increases the value of the reference count by one in the local hash map entry for the physical block. Additionally, destination node 106 (e.g., using VSAN module 135) creates a logical block for the offset of the file that maps to the physical block.

If the current entry in the write buffer is not directed to writing a duplicate of an existing, local data block stored by destination node 106, at block 420, destination node 106 (e.g., using VSAN module 135) allocates a new physical block and writes the data content from the write buffer to the new physical block. Additionally, destination node 106 creates a logical block for the offset of the file that maps to the new physical block and adds a hash of the data content to the local hash map.

As a result, destination node 106 is able to use hashes from source node 105 to increment a reference count and create a logical block for each matching hash, leveraging deduplication across nodes 105-107 rather than requiring source node 105 to waste processing and networking resources to transmit a duplicate copy. Additionally, the distributed storage system does not need process write commands and perform deduplication atomically or otherwise in a synchronized manner, allowing nodes 105-107 to process writes and transfers at a faster rate. Processing write commands and transfers in this manner would ordinarily create the risk of an overwrite or other change to a physical block occurring after the detection of a matching hash but before incrementing the reference count for the physical block. If the reference count was increased and logical block mapped to the changed physical block, a race condition between incrementing the reference count and changing the physical block could result in the file including corrupt or incorrect data. Destination node 106 avoids this potential data corruption by incrementing the reference count via processing a copy of the local data through the write buffer and allowing any intervening write commands directed to the physical block be processed first.

It will be apparent from this description that aspects of the inventions may be embodied, at least in part, in software. That is, the computer-implemented methods 200, 300, and 400 may each be carried out in a computer system or other data processing system, such as nodes 105-107, in response to its processor executing sequences of instructions contained in a memory or other non-transitory machine-readable storage medium. The software may further be transmitted or received over a network (not shown) via a network interface. In various embodiments, hardwired circuitry may be used in combination with the software instructions to implement the present embodiments. It will also be appreciated that additional components, not shown, may also be part of nodes 105-107, and, in certain embodiments, fewer components than that shown in FIG. 1 may also be used in nodes 105-107.

An article of manufacture, such as a non-transitory computer readable medium, may be used to store program code providing at least some of the functionality of the embodiments described above. Additionally, an article of manufacture may be used to store program code created using at least some of the functionality of the embodiments described above. An article of manufacture that stores program code may be embodied as, but is not limited to, one or more memories (e.g., one or more flash memories, random access memories—static, dynamic, or other), optical disks, CD-ROMs, DVD-ROMs, EPROMs, EEPROMs, magnetic or optical cards or other type of non-transitory machine-readable media suitable for storing electronic instructions. Additionally, embodiments of the invention may be implemented in, but not limited to, hardware or firmware utilizing an FPGA, ASIC, a processor, a computer, or a computer system including a network. Modules and components of hardware or software implementations can be divided or combined without significantly altering embodiments of the invention.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses distinct name spaces to isolate the containers from each other and therefore provides operating-system level segregation of the different groups of applications that operate within different containers. This segregation is akin to the VM segregation that is offered in hypervisor-virtualized environments, and thus can be viewed as a form of virtualization that isolates different groups of applications that operate in different containers. Such containers are more lightweight than VMs.

It should be recognized that while the specification refers to VMs, the examples given could be any type of DCNs, including physical hosts, VMs, non-VM containers, and hypervisor kernel network interface modules. In fact, the example networks could include combinations of different types of DCNs in some embodiments.

In the foregoing specification, the invention has been described with reference to specific exemplary embodiments thereof. Various embodiments and aspects of the invention(s) are described with reference to details discussed in this document, and the accompanying drawings illustrate the various embodiments. The description above and drawings are illustrative of the invention and are not to be construed as limiting the invention. References in the specification to "one embodiment," "an embodiment," "an exemplary embodiment," etc., indicate that the embodiment described may include a particular feature, structure, or characteristic, but not every embodiment may necessarily include the particular feature, structure, or characteristic. Moreover, such phrases are not necessarily referring to the same embodiment. Furthermore, when a particular feature, structure, or characteristic is described in connection with an embodiment, such feature, structure, or characteristic may be implemented in connection with other embodiments whether or not explicitly described. Additionally, as used in this document, the term "exemplary" refers to embodiments that serve as simply an example or illustration. The use of exemplary should not be construed as an indication of preferred examples. Blocks with dashed borders (e.g., large dashes, small dashes, dot-dash, dots) are used to illustrate optional operations that add additional features to embodiments of the invention. However, such notation should not be taken to mean that these are the only options or optional operations, and/or that blocks with solid borders are not optional in certain embodiments of the invention. Numerous specific details are described to provide a thorough understanding of various embodiments of the present invention. However, in certain instances, well-known or conventional details are not described in order to provide a concise discussion of embodiments of the present inventions.

It will be evident that various modifications may be made thereto without departing from the broader spirit and scope of the invention as set forth in the following claims. For example, the methods described in this document may be performed with fewer or more features/blocks or the features/blocks may be performed in differing orders. Additionally, the methods described in this document, or portions thereof, may be repeated or performed in parallel with one another or in parallel with different instances of the same or similar methods.

What is claimed is:

1. A computer-implemented method, comprising:
   receiving, at a destination node and from a source node, a collection of hashes of data stored by the source node and designated for transfer from the source node to the destination node;
   comparing, by the destination node, each hash in the collection of hashes of data stored by the source node to a local collection of hashes of data stored by the destination node;
   in response to determining a match between one or more first hashes of data received from the source node and one or more corresponding local hashes of data stored by the destination node: i) reading matching data stored by the destination node into respective entries of a write buffer for the destination node, the write buffer including one or more unprocessed write commands to corresponding data stored by the destination node and ii) setting a first indicator, which indicates that the data does not need to be transferred by the source node;
   after comparing each hash in the collection of hashes, transmitting, by the destination node, a collection of indicators to the source node indicating non-matching data blocks to be transferred from the source node to the destination node;
   receiving, by the destination node and from the source node, the non-matching data blocks and writing received non-matching data to the write buffer for the destination node;
   reading each entry of data from the write buffer for the destination node; and
   for each entry corresponding to matching data, determining whether the entry corresponds to data stored by the destination node that has remained unchanged by any earlier unprocessed write commands of the write buffer from the time the entry was entered to the write buffer to the time the entry is read,
      wherein, in response to determining that the entry corresponds to data that has remained unchanged, increasing a reference count for the data as stored by the destination node, and
      wherein, in response to determining that the entry corresponds to data that has changed, writing the data from the entry to a new block of the destination node.

2. The computer-implemented method of claim 1, wherein the source node omits the data from a transfer to the destination node in response to the first indicator that the data is present at the source node.

3. The computer-implemented method of claim 1, further comprising:
   processing, after the data being added to the write buffer in response to receiving the collection of hashes, write commands that were added to the write buffer prior to the data being added to the write buffer.

4. The computer-implemented method of claim 1, wherein each hash of the collection of hashes represents a different portion of a file designated for transfer from the source node to the destination node.

5. The computer-implemented method of claim 4, wherein each hash is received at the destination node with an offset value indicating which portion of the file the hash represents.

6. The computer-implemented method of claim 4, further comprising:
   determining, by the destination node, that a second hash of the collection of hashes does not map to a local hash of data stored by the destination node;
   in response to determining that the second hash does not map to a local hash of data stored by the destination node, setting a second indicator that the portion of the file represented by the second hash is not present at the source node;
   transmitting the second indicator as part of the collection of indicators to the source node; and
   receiving, from the source node, a copy of the portion of the file represented by the second hash, wherein the source node transfers the copy of the portion of the file represented by the second hash in response to the second indicator.

7. The computer-implemented method of claim 6, wherein the first and second indicators are transmitted to the source node as a bitmap.

8. A non-transitory computer-readable medium storing instructions, which when executed by a processing device, cause the processing device to perform a method comprising:
   receiving, at a destination node and from a source node, a collection of hashes of data stored by the source node and designated for transfer from the source node to the destination node;
   comparing, by the destination node, each hash in the collection of hashes of data stored by the source node to a local collection of hashes of data stored by the destination node;
   in response to determining a match between one or more first hashes of data received from the source node and one or more corresponding local hashes of data stored by the destination node: i) reading matching data stored by the destination node into respective entries of a write buffer for the destination node, the write buffer including one or more unprocessed write commands to corresponding data stored by the destination node and ii) setting a first indicator, which indicates that the data does not need to be transferred by the source node;
   after comparing each hash in the collection of hashes, transmitting, by the destination node, a collection of indicators to the source node indicating non-matching data blocks to be transferred from the source node to the destination node;
   receiving, by the destination node and from the source node, the non-matching data blocks and writing received non-matching data to the write buffer for the destination node;
   reading each entry of data from the write buffer for the destination node; and
   for each entry corresponding to matching data, determining whether the entry corresponds to data stored by the destination node that has remained unchanged by any earlier unprocessed write commands of the write buffer from the time the entry was entered to the write buffer to the time the entry is read,
      wherein, in response to determining that the entry corresponds to data that has remained unchanged, increasing a reference count for the data as stored by the destination node, and
      wherein, in response to determining that the entry corresponds to data that has changed, writing the data from the entry to a new block of the destination node.

9. The non-transitory computer-readable medium of claim 8, wherein the source node omits the data from a transfer to the destination node in response to the first indicator that the data is present at the source node.

10. The non-transitory computer-readable medium of claim 8, the method further comprising:
processing, after the data being added to the write buffer in response to receiving the collection of hashes, write commands that were added to the write buffer prior to the data being added to the write buffer.

11. The non-transitory computer-readable medium of claim 8, wherein each hash of the collection of hashes represents a different portion of a file designated for transfer from the source node to the destination node.

12. The non-transitory computer-readable medium of claim 11, wherein each hash is received at the destination node with an offset value indicating which portion of the file the hash represents.

13. The non-transitory computer-readable medium of claim 11, the method further comprising:
determining, by the destination node, that a second hash of the collection of hashes does not map to a local hash of data stored by the destination node;
in response to determining that the second hash does not map to a local hash of data stored by the destination node, setting a second indicator that the portion of the file represented by the second hash is not present at the source node;
transmitting the second indicator as part of the collection of indicators to the source node; and
receiving, from the source node, a copy of the portion of the file represented by the second hash, wherein the source node transfers the copy of the portion of the file represented by the second hash in response to the second indicator.

14. The non-transitory computer-readable medium of claim 13, wherein the first and second indicators are transmitted to the source node as a bitmap.

15. A destination node comprising:
a processing device; and
a memory coupled to the processing device, the memory storing instructions which, when executed by the processing device, cause the destination node to:
receive, from a source node, a collection of hashes of data stored by the source node and designated for transfer from the source node to the destination node;
compare each hash in the collection of hashes of data stored by the sourced node to a local collection of hashes of data stored by the destination node;
in response to determining a match between one or more first hashes of data received from the source node and one or more corresponding local hashes of data stored by the destination node: i) reading matching data stored by the destination node into respective entries of a write buffer for the destination node, the write buffer including one or more unprocessed write commands to corresponding data stored by the destination node and ii) setting a first indicator, which indicates that the data does not need to be transferred by the source node;
after comparing each hash in the collection of hashes, transmit a collection of indicators to the source node indicating non-matching data blocks to be transferred from the source node to the destination node;
receive, from the source node, the non-matching data blocks and writing received non-matching data to the write buffer for the destination node;
read each entry of data from the write buffer for the destination node; and
for each entry corresponding to matching data, determining whether the entry corresponds to data stored by the destination node that has remained unchanged by any earlier unprocessed write commands of the write buffer from the time the entry was entered to the write buffer to the time the entry is read,
wherein, in response to determining that the entry corresponds to data that has remained unchanged, increasing a reference count for the data as stored by the destination node, and
wherein, in response to determining that the entry corresponds to data that has changed, writing the data from the entry to a new block of the destination node.

16. The destination node of claim 15, wherein the source node omits the data from a transfer to the destination node in response to the first indicator that the data is present at the source node.

17. The destination node of claim 15, wherein the instructions further cause the destination node to:
processing, after the data being added to the write buffer in response to receiving the collection of hashes, write commands that were added to the write buffer prior to the data being added to the write buffer.

18. The destination node of claim 15, wherein each hash of the collection of hashes represents a different portion of a file designated for transfer from the source node to the destination node.

19. The destination node of claim 18, wherein each hash is received at the destination node with an offset value indicating which portion of the file the hash represents.

20. The destination node of claim 18, wherein the instructions further cause the destination node to:
determine that a second hash of the collection of hashes does not map to a local hash of data stored by the destination node;
in response to determining that the second hash does not map to a local hash of data stored by the destination node, set a second indicator that the portion of the file represented by the second hash is not present at the source node;
transmit the second indicator as part of the collection of indicators to the source node; and
receive, from the source node, a copy of the portion of the file represented by the second hash, wherein the source node transfers the copy of the portion of the file represented by the second hash in response to the second indicator.

* * * * *